United States Patent
de Zeeuw et al.

(10) Patent No.: US 9,418,057 B2
(45) Date of Patent: Aug. 16, 2016

(54) FRAUD DETECTION USING TEXT ANALYSIS

(71) Applicants: Aaron J. de Zeeuw, Dallas, TX (US); Clark T. Rothrock, McKinney, TX (US); Jason L. Alexander, Rockwall, TX (US)

(72) Inventors: Aaron J. de Zeeuw, Dallas, TX (US); Clark T. Rothrock, McKinney, TX (US); Jason L. Alexander, Rockwall, TX (US)

(73) Assignee: Match.com, L.L.C, Dallas, TX (US)

( * ) Notice: Subject to any disclaimer, the term of this patent is extended or adjusted under 35 U.S.C. 154(b) by 8 days.

(21) Appl. No.: 14/511,663

(22) Filed: Oct. 10, 2014

(65) Prior Publication Data
US 2015/0095019 A1 Apr. 2, 2015

Related U.S. Application Data

(63) Continuation of application No. 13/307,986, filed on Nov. 30, 2011, now Pat. No. 8,862,461.

(51) Int. Cl.
*G06F 17/27* (2006.01)
*G06F 17/22* (2006.01)
*G06F 21/36* (2013.01)
*G06Q 30/02* (2012.01)

(52) U.S. Cl.
CPC ........ *G06F 17/2725* (2013.01); *G06F 17/2211* (2013.01); *G06F 17/2785* (2013.01); *G06F 21/36* (2013.01); *G06Q 30/0248* (2013.01)

(58) Field of Classification Search
CPC . G06F 17/30719; G06F 17/279; G06F 17/27; G06F 17/2715; G06F 17/2785; G06F 17/274
USPC ............... 704/9, 219, 223, 258, 265, 500; 370/468, 472; 375/250, 262
See application file for complete search history.

(56) References Cited

U.S. PATENT DOCUMENTS

| | | | | |
|---|---|---|---|---|
| 5,689,716 A * | 11/1997 | Chen | ............. | G06F 17/2785 707/E17.094 |
| 7,017,114 B2 * | 3/2006 | Guo | ............. | G06F 17/27 707/999.001 |
| 7,251,781 B2 * | 7/2007 | Batchilo | ............. | G06F 17/2715 704/9 |
| 7,263,530 B2 * | 8/2007 | Hu | ............. | G06F 17/30719 |
| 7,702,680 B2 * | 4/2010 | Yih | ............. | G06F 17/30719 707/738 |
| 7,984,500 B1 * | 7/2011 | Khanna | ............. | G06F 21/552 709/225 |
| 8,056,128 B1 * | 11/2011 | Dingle | ............. | G06F 17/2211 726/22 |
| 8,225,413 B1 * | 7/2012 | De | ............. | G06F 21/6245 726/22 |

(Continued)

OTHER PUBLICATIONS

Markov chain, From Wikipedia, the Free Encyclopedia, http://en.wikipedia.org/wiki/Markov_chain, 10 pages, Jul. 9, 2011.

(Continued)

*Primary Examiner* — Michael Colucci
(74) *Attorney, Agent, or Firm* — Baker Botts L.L.P.

(57) ABSTRACT

In one embodiment, a method executed by at least one processor includes receiving text from submitted by a user. The method also includes determining a text score for the received text by comparing a first set of phrases included in the received text to a second set of phrases. The second set of phrases includes phrases from stored text. The stored text includes stored text known to be genuine and stored text known to be fraudulent. The method also includes determining that the received text is fraudulent based on the text score.

27 Claims, 5 Drawing Sheets

(56) References Cited

U.S. PATENT DOCUMENTS

| | | | | |
|---|---|---|---|---|
| 8,245,282 B1* | 8/2012 | Buckwalter | G06Q 10/10 | 726/25 |
| 8,554,631 B1* | 10/2013 | Barton | G06Q 20/20 | 705/16 |
| 8,554,912 B1* | 10/2013 | Reeves | G06F 21/552 | 455/410 |
| 2002/0052901 A1* | 5/2002 | Guo | G06F 17/27 | 715/247 |
| 2003/0130837 A1* | 7/2003 | Batchilo | G06F 17/2715 | 704/9 |
| 2006/0026102 A1* | 2/2006 | Ryan, Jr. | G07B 17/00362 | 705/50 |
| 2006/0047725 A1* | 3/2006 | Bramson | G06F 21/604 | |
| 2006/0285665 A1* | 12/2006 | Wasserblat | G10L 17/26 | 379/114.14 |
| 2007/0094066 A1* | 4/2007 | Kumar | G06Q 10/04 | 706/61 |
| 2007/0129999 A1* | 6/2007 | Zhou | G06Q 30/0248 | 705/14.47 |
| 2008/0115213 A1* | 5/2008 | Bhatt | G06F 21/316 | 726/22 |
| 2008/0162383 A1* | 7/2008 | Kraft | G06Q 99/00 | 705/500 |
| 2008/0275748 A1* | 11/2008 | John | G06Q 30/06 | 705/35 |
| 2009/0157675 A1* | 6/2009 | Stellhorn | G06Q 10/107 | |
| 2009/0164464 A1 | 6/2009 | Carrico et al. | | |
| 2009/0307028 A1* | 12/2009 | Eldon | G06Q 20/12 | 705/37 |
| 2010/0094791 A1* | 4/2010 | Miltonberger | G06Q 10/067 | 706/46 |
| 2010/0228656 A1* | 9/2010 | Wasserblat | G06Q 10/10 | 705/35 |
| 2010/0241507 A1* | 9/2010 | Quinn | G06Q 30/02 | 705/14.42 |
| 2010/0281313 A1* | 11/2010 | White | G06Q 30/02 | 714/57 |
| 2011/0040983 A1* | 2/2011 | Grzymala-Busse | G06F 21/6245 | 713/189 |
| 2011/0238510 A1* | 9/2011 | Rowen | G06K 9/00187 | 705/16 |
| 2012/0020473 A1* | 1/2012 | Mart | H04L 12/5855 | 379/265.09 |
| 2012/0023566 A1* | 1/2012 | Waterson | G06F 21/56 | 726/9 |
| 2012/0246089 A1* | 9/2012 | Sikes | H04M 1/72536 | 705/325 |
| 2012/0296692 A1* | 11/2012 | O'Malley | G06Q 10/0635 | 705/7.28 |
| 2012/0304260 A1* | 11/2012 | Steeves | G06F 21/31 | 726/5 |
| 2013/0024376 A1* | 1/2013 | Choudhuri | G06Q 40/00 | 705/44 |
| 2013/0091052 A1* | 4/2013 | Kaperdal | G06Q 20/227 | 705/39 |
| 2013/0117374 A1* | 5/2013 | Meyer | G06F 21/606 | 709/205 |

OTHER PUBLICATIONS

Bayesian inference, From Wikipedia, the Free Encyclopedia, http://en.wikipedia.org/wiki/Bayesian_inference, 11 pages, Jul. 13, 2011.

Pending U.S. Appl. No. 13/307,868, entitled Fraud Detection Using Image Analysis, by Aaron J. de Zeeuw, et al., 35 pages, filed Nov. 30, 2011.

* cited by examiner

FRAUD DETECTION USING TEXT ANALYSIS

RELATED APPLICATIONS

This application is a continuation application of U.S. patent application Ser. No. 13/307,986, entitled "Fraud Detection Using Text Analysis," which was filed on Nov. 30, 2011, and issues as U.S. Pat. No. 8,862,461 on Oct. 14, 2014.

TECHNICAL FIELD

This disclosure relates generally to communication systems and more particularly to fraud detection using text analysis.

BACKGROUND

Networking architectures have grown increasingly complex in communications environments. In recent years, a series of protocols and configurations have been developed in order to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction.

One problem that has arisen is that certain users have attempted to co-opt the increased opportunity for communication for malicious purposes. For example, certain users have attempted to send unwanted advertising through the communicative platforms. As another example, certain users attempt to submit false profiles to assume a false identity on social networking services. One solution to this problem is to manually review reported incidents of such activity. This is problematic because it can be expensive and time consuming. Further, this may not prevent unwanted activity from occurring.

SUMMARY

In one embodiment, a method executed by at least one processor includes receiving text from submitted by a user. The method also includes determining a text score for the received text by comparing a first set of phrases included in the received text to a second set of phrases. The second set of phrases includes phrases from stored text. The stored text includes stored text known to be genuine and stored text known to be fraudulent. The method also includes determining that the received text is fraudulent based on the text score.

In some embodiments, determining the text score for the received text may include determining a phrase score for each phrase of the first set of phrases by comparing the words of each phrase of the first set of phrases to the second set of phrases. It may also include determining the text score by adding the phrase scores of each phrase of the first set of phrases. The stored text may be organized in at least one tree structure. Determining that the received text is fraudulent based on the text score comprises may include comparing the text score to a threshold. Comparing the first set of phrases included in the received text to a second set of phrases may include generating a tree structure corresponding to the first set of phrases.

In one embodiment, a system includes an interface configured to receive text submitted by a user. The system also includes at least one processor configured to determine a text score for the received text by comparing a first set of phrases included in the received text to a second set of phrases. The second set of phrases includes phrases from stored text. The at least one processor is also configured to determine that the received text is fraudulent based on the text score.

Depending on the specific features implemented, particular embodiments may exhibit some, none, or all of the following technical advantages. Various embodiments may be capable of automatically detecting a user submitting fraudulent text without the need for manual review of the user's submission. Some embodiments may be capable of automatically updating the textual analysis methods based on the most recent user submissions. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1A:
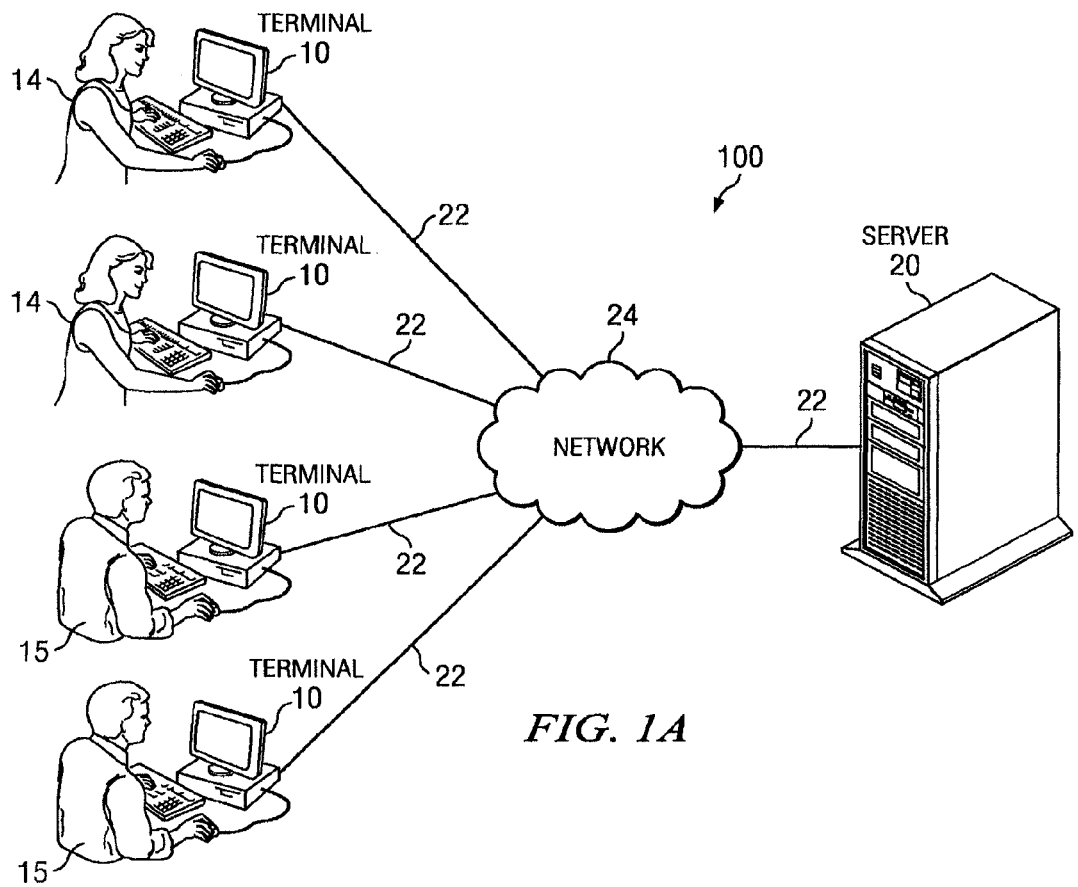
FIG. 1A is a simplified block diagram of a system for facilitating communication in a network environment, in accordance with a particular embodiment.
Figure 1B:
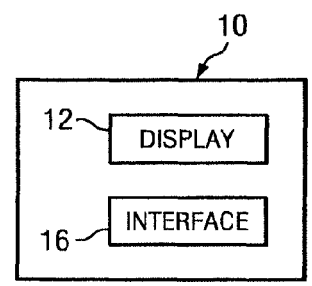
FIG. 1B shows the contents of the terminal from FIG. 1A.
Figure 1C:
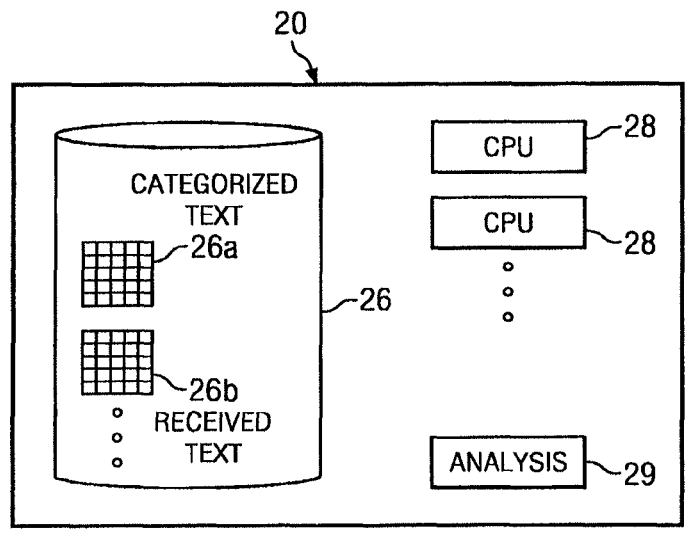
FIG. 1C shows the contents of the matching server from FIG. 1A.

Referring to FIG. 1A, one embodiment of a communication system is shown. FIG. 1A is a simplified block diagram of a system 100 for facilitating communication in a network environment. Users 14-15 interact with server 20 through terminals 10. FIG. 1B is a diagram showing, in one embodiment, certain contents of terminal 10. Terminal 10 comprises interface 16 (so that users 14-15 may be able to interact with terminal 10) and display 12. FIG. 1C is a diagram showing, in one embodiment, certain contents of server 20. Server 20 comprises memory 26, at least one CPU 28, and analysis module 29. Terminal 10 and server 20 are communicatively coupled via network connections 22 and network 24. In some embodiments, analysis module 29 may be configured to analyze text sent from users 14-15 and determine whether the text is fraudulent. In particular embodiments, fraudulent text may include false information regarding personal descriptions, false information regarding demographic information, phishing messages, spam messages, unwanted advertising, harassing messages, and other submissions that may constitute an inappropriate use of a service provided by server 20.

Users 14-15 are clients, customers, prospective customers, or entities wishing to participate in an on-line dating scenario and/or to view information associated with other participants in the system. Users 14-15 may also seek to access or to initiate communication with other users that may be delivered via network 24. Users 14-15 may review data (such as profiles, for example) associated with other users in order to make matching decisions or elections. Data, as used herein, refers to any type of numeric, voice, video, text, or script data, or any other suitable information in any appropriate format that may be communicated from one point to another.

In one embodiment, terminal 10 represents (and is inclusive of) a personal computer that may be used to access network 24. Alternatively, terminal 10 may be representative of a cellular telephone, an electronic notebook, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a human user such as a video camera, a microphone, a keyboard, a mouse, or any other appropriate equipment according to particular configurations and arrangements. In addition, interface 16 may be a unique element designed specifically for communications involving system 100. Such an element may be fabricated or produced specifically for matching applications involving a user.

Display 12, in one embodiment, is a computer monitor. Alternatively, display 12 may be a projector, speaker, or other device that allows users 14-15 to appreciate information that system 100 transmits.

Network 24 comprises one or more communicative platforms operable to exchange data or information emanating from users 14-15. Network 24 could be a plain old telephone system (POTS). Transmission of information emanating from the user may be assisted by management associated with server 20 or manually keyed into a telephone or other suitable electronic equipment. In other embodiments, network 24 could be any packet data network offering a communications interface or exchange between any two nodes in system 100. Network 24 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment, including a combination of any networks or systems described above. In various embodiments, network connections 22 may include, but are not limited to, wired and/or wireless mediums which may be provisioned with routers and firewalls.

Server 20 is operable to receive and to communicate information to terminal 10. In some embodiments, server 20 may comprise a plurality of servers or other equipment, each performing different or the same functions in order to receive and communicate information to terminal 10. Server 20 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In some embodiments, server 20 may comprise one or more clusters of virtual or hardware-based computing nodes, a distributed computing infrastructure, or other suitable forms of providing a software service using multiple computers. In some embodiments, server 20 may offer one or more services to users 14 and 15 via network 24 such as social networking, professional networking, conference services, messaging, gaming, online dating, marketplace, discussion board, news, or other suitable services. Server 20 can be used to identify and to evaluate suitable candidates in various areas (e.g. hiring/employment, recruiting, real estate, general person searches, online dating, etc.).

In some embodiments, memory 26 may include multiple storage structures 26*a* and 26*b*, one or file systems, as well as other suitable structures for storing and retrieving data. For example, storage structures 26*a* and 26*b* may be implemented using one or more databases, file systems, tables, stacks, heaps, or other suitable storage structures.

In some embodiments, users 14-15, using terminals 10, register with server 20. Registration may include users 14-15 submitting information to server 20 about users 14-15 as well as characteristics with which users 14-15 are seeking to be matched. Such information may include user handles, which may be a combination of characters that uniquely identifies users 14-15 to server 20. In various embodiments, server 20 may be configured to collect this information; for example, server 20 may be configured to ask users 14-15 to respond to a series of questions. Questions posed by server 20 may include questions seeking narrative responses from users 14-15, such as one or more paragraphs of text. Server 20 may also pose questions to users 14-15 that may require shorter responses, such as a single character, a single word, a phrase, multiple phrases, or one or more sentences. Server 20 may be configured to receive the information submitted by users 14-15 and create profiles for users 14-15 based on that information, storing the profiles in memory 26. In some embodiments, server 20 may be configured to facilitate the delivery of messages sent from users 14-15.

As an example only, user 14 can access the Internet via terminal 10, travel to a web site managed by server 20, and register for a service. As part of the registration process, server 20 may ask user 14 a series of questions which identifies characteristics about user 14. Thus, server 20 may ask about the height, weight, age, location, and ethnicity of user 14. It may also ask about the birthplace, parents, eating habits, activities, and goals of user 14. In particular embodiments, server 20 may prompt user 14 for a narrative description of user 14 that may include characteristics of user 14 and characteristics that user 14 prefers in a match. In some embodiments, server 20 may specify that any number of questions or requested descriptions are necessary before registration may be concluded. After concluding the registration process, server 20 may store the responses of user 14 as a profile. This same process may be repeated by several different users, causing server 20 to contain a plurality of profiles. In some embodiments, by providing accurate information, the various users have submitted genuine textual information to server 20. Another example of users 14 submitting genuine textual information server 20 may be sending messages to be delivered by server 20 that are not attempts by the users to present unwanted advertisements (i.e., spam), to elicit private information (i.e., phishing attempts), or to engage in other generally elicit or undesirable activities.

As an other example, a user 15 may provide information to server 20 similar to user 14 described in the example above. In particular embodiments, server 20 may prompt user 15 for a narrative description of user 15 that may include characteristics of user 15 and characteristics that user 15 prefers in a match. However, user 15 may have a malicious intent and submit fraudulent text. Such fraudulent text may include false information regarding personal descriptions and/or demographic information. User 15 may attempt to register a false profile with server 20 for malicious purposes. Such purposes may include accessing information of other users of server 20, attempting to deceive other users of server 20, circumventing restrictions of services provided by server 20, and access protected information stored on server 20. Another example of fraudulent text that may be submitted by user 15 is messages to be delivered by server 20 that include unwanted advertisements (i.e., spam), attempts to elicit private information (i.e., phishing attempts), or attempts to engage in other generally elicit or undesirable activities.

In some embodiments, analysis module 29 may be implemented using any suitable combination of hardware, firmware, and software. Analysis module 29 may be configured to analyze profiles submitted by users 14 and 15 to determine whether they are fraudulent or genuine. Text received by server 20 that will be processed by analysis module 29 may be stored in storage structure 26b. Analysis module 29 may use previously submitted text that is known to be genuine or known to be fraudulent stored in memory 26 in such determinations. For example, storage structure 26a may include categorized text, such as text known to be genuine and text known to be fraudulent. Analysis module 29 may generate a score for a profile submitted by user 14 or 15 by comparing text present in the submitted profile to text known to be genuine and text known to be fraudulent. The score may be compared to a threshold, and the profile may be determined to be fraudulent or genuine based on this comparison. For example, if the score is higher than the threshold, then the profile may be determined to be genuine; and if the score is at or below the threshold, then the profile may be determined to be fraudulent. Examples of how analysis module 29 may determine whether text submitted by users 14 and/or 15 is fraudulent or genuine are discussed below with respect to FIGS. 3-5. In some embodiments, analysis module 29 may provide an advantage by automatically detecting a submission of fraudulent text from a user (such as users 14 or 15) without the need for manual review of the user's submission In some embodiments, server 20 may cause analysis module 29 to analyze received text on a periodic basis. For example, analysis module 29 may be configured to analyze text received by server 20 every certain number of hours, such as every four hours. In some embodiments, analysis module 29 may be invoked when a certain amount of text has been received by server 20, such as ten messages and/or profiles. The use of analysis module 29 by server 20 may provide an advantage in that users of services offered by server 20 with malicious intent may be identified and prevented from perpetrating malicious activity on server 20 or against other users of server 20. Services offered by server 20 may also be enhanced by identifying users 15 who attempt to submit fraudulent profiles.

Figure 2:
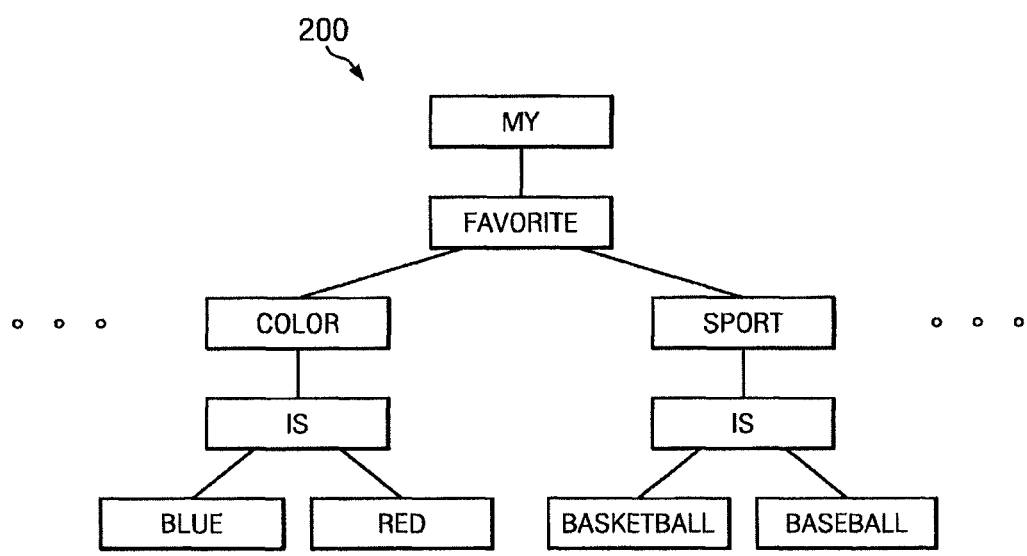
FIG. 2 illustrates one embodiment of a portion of a tree that stores text.

FIG. 2 illustrates one embodiment of a portion of tree 200 that stores text. Tree 200 is an example of how text used by analysis module 29 of FIG. 1C may be stored and accessed. For example, text known to be genuine and text known to be fraudulent may be stored in structures such as tree 200. As another example, text received by server 20 of FIG. 1A to be processed by analysis module 29 may be stored in structures such as tree 200. Tree 200 stores the order of words in phrases or sentences as branches. The portion of tree 200 illustrated in FIG. 2 depicts an example of how the following sentences may be stored using a tree structure:

"My favorite color is blue."
"My favorite color is red."
"My favorite sport is basketball."
"My favorite sport is baseball."

In some embodiments, tree 200 may store identifiers associated with words instead of (or in addition to) the words themselves. For example, the following associations of words and identifiers may be stored: "my"-45; "favorite"-29; "color"-35; "is"-10; "blue"-37; "red"-75; "sport"-89; "bas-ketball"-245; "baseball"-235. Using such associations, the sentences may be associated with a set of identifiers, as the following examples illustrate:

"My favorite color is blue."-{45, 29, 35, 10, 37}
"My favorite color is red."-{45, 29, 35, 10, 75}
"My favorite sport is basketball."-{45, 29, 89, 10, 245}
"My favorite sport is baseball."-{45, 29, 89, 10, 235}

Hence, in the examples discussed above, instead of having words in the branches as depicted in FIG. 2, tree 200 may store the identifiers associated with the words in each branch. Storing phrases or sentences using a structure such as tree 200 may provide advantages such as requiring lower memory and/or processing when attempting to match portions of various sentences or phrases against each other to detect fraudulent text.

Figure 3:
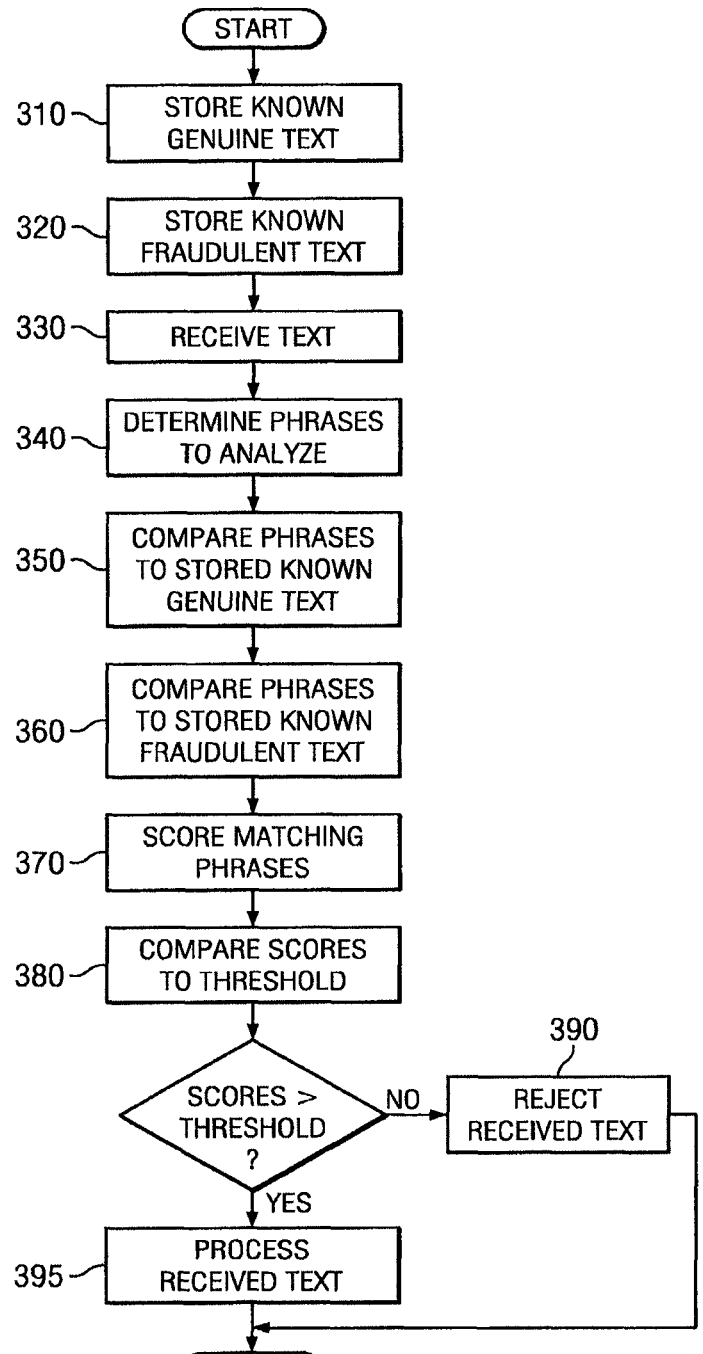
FIGS. 3-5 are flowcharts that illustrate various embodiments of detecting fraudulent text.
Figure 4:
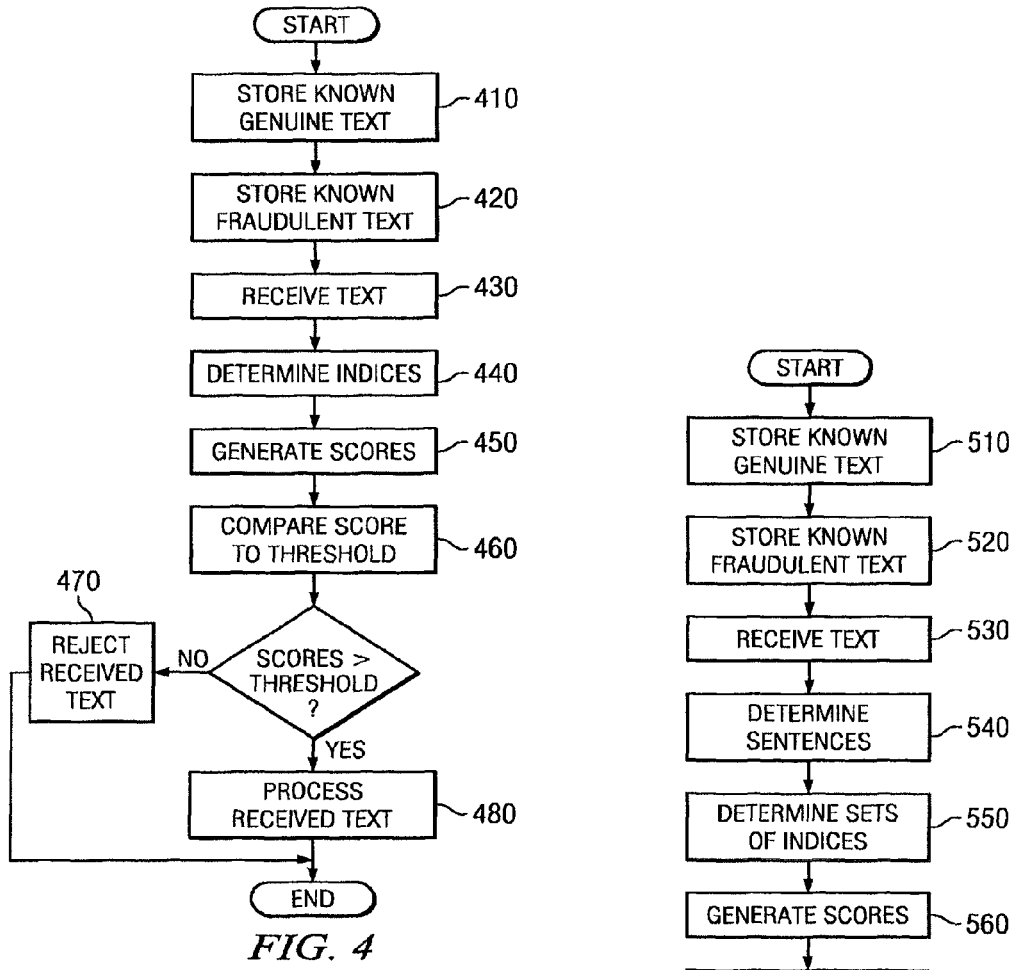
Figure 5:
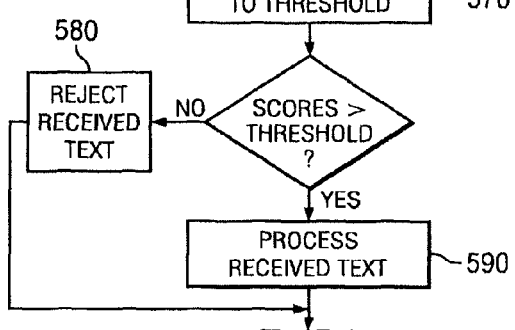

FIGS. 3-5 are flowcharts that illustrate various embodiments of detecting fraudulent text that may be implemented by server 20 of FIG. 1A. In general, the steps illustrated in FIGS. 3-5 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1A-1C.

FIG. 3 is a flowchart illustrating one embodiment of how text may be analyzed to determine whether it is genuine or fraudulent. At step 310, in some embodiments, text known to be genuine may be stored. For example, server 20 may receive profiles or messages from users 14 of FIG. 1A. It may be determined that the content submitted by users 14 is genuine. In some embodiments, such a determination may be based on subsequent activity of users 14, on a review of the submitted content, and/or on other factors. As another example, users 14 may send messages that are determined to be genuine. The text of the content known to be genuine submitted by users 14 may be stored by server 20 of FIG. 1A at step 310. For example, the text may be stored in storage structure 26a of FIG. 1C. In some embodiments, the text may be processed before being stored. For example, the text may be normalized, punctuation may be removed or reformatted, white spaces, tabs, line breaks, or other similar formatting may be normalized and/or removed, or other suitable modifications may be performed on the text before it is stored. In some embodiments, the text may be stored in a database, the text may be indexed, and/or the text may be organized in a tree-like structure, such as tree 200 of FIG. 2. For example, each word may be assigned a numeric identifier and the association may be stored (e.g., in a dictionary structure). In some embodiments, word pairs formed from adjacent words in sentences in the text known to be genuine may be associated with a list of references that indicate where such word pairs may be found in the tree-like structure used to store the text known to be genuine. The set of word pairs and their locations in the tree-like structure may be stored in the same structure used to store the associations between individual words and identifiers or in a different, dictionary-like structure.

In some embodiments, the text stored at step 310 may be selected from recent user activity. For example, text determined to be genuine and stored at step 310 may be taken from user submissions such as profile submissions, registrations, and/or messages that occurred within a given time frame, such as within a day or within a particular number of hours (e.g., five hours). This may be advantageous, in various embodiments, as it allows for the analysis described in FIG. 3 to be automatically updated with recent information or trends in user submissions.

At step 320, in some embodiments, text known to be fraudulent may be stored. This step may occur before, during, or after step 310. For example, server 20 may receive profiles or messages from users 15 of FIG. 1A. It may be determined that the content submitted by users 15 is fraudulent. In some embodiments, such a determination may be based on subsequent activity of users 15 and/or based on a review of the content of the received profiles. Examples of fraudulent content submitted by users 15 may include impersonation, phishing messages, spam, false identification information, automatically generated profiles, and false profiles. The text of the content submitted by users 15 known to be fraudulent may be stored by server 20 of FIG. 1A at step 320. For example, the text may be stored in storage structure 26a of FIG. 1C. In some embodiments, the text may be processed before being stored. For example, the text may be normalized, punctuation may be removed or reformatted, white spaces, tabs, line breaks, or other similar formatting may be normalized and/or removed, or other suitable modifications may be performed on the text before it is stored. In some embodiments, the text may be stored in a database, the text may be indexed, and/or the text may be organized in a tree structure such as tree 200 of FIG. 2. For example, each word may be assigned a numeric identifier and the association may be stored (e.g., in a dictionary structure). In some embodiments, word pairs formed from adjacent words in sentences in the text known to be fraudulent may be associated with a list of references that indicate where such word pairs may be found in the tree-like structure used to store the text known to be genuine. The set of word pairs and their locations in the tree-like structure may be stored in the same structure used to store the associations between individual words and identifiers or in a different, dictionary-like structure.

In some embodiments, the text stored at step 320 may be selected from recent user activity. For example, text determined to be genuine and stored at step 320 may be taken from user submissions such as profile submissions, registrations, and/or messages that occurred within a given time frame, such as within a day or within a particular number of hours (e.g., five hours). This may be advantageous, in various embodiments, as it allows for the analysis described in FIG. 3 to be automatically updated with recent information or trends in user submissions.

In some embodiments, the text known to be fraudulent may be stored in the same structure as the text known to be fraudulent. For example, a tree-like structure such as tree 200 of FIG. 2 may be used to store both text known to be genuine and text known to be fraudulent. In this example, each branch of the tree-like structure may be associated with a count based on the number of sentences from the text known to be genuine and known to be fraudulent was associated with that branch. The count may be increased by one for each sentence associated with that branch that came from the text known to be genuine and the count may be decreased by one for each sentence associated with that branch that came from the text known to be fraudulent. The count may also reflect the number of branches that have been traversed to reach the branch. For example, the following sentences have been illustrated as stored in tree 200 of FIG. 2 and may have the associations indicated below:

"My favorite color is blue." (Genuine)
"My favorite color is red." (Genuine)
"My favorite sport is basketball." (Genuine)
"My favorite sport is baseball." (Fraudulent)

In such an example, the branch associated with the word "color" may have a count of +6 because two sentences have reached that branch, in each sentence there were two branches above the branch associated with the word "color," and both sentences were from text known to be genuine. Continuing the example, the branch associated with word "sport" may have a count of 0 because though two sentences have reached that branch, one sentence came from text known to be genuine while the other sentence came from text known to be fraudulent.

At step 330, in some embodiments, text is received from a user such as one of users 14 or 15 at server 20. As examples, a user may submit a profile or a message. Server 20 may be configured to determine whether the text received at this step is genuine or fraudulent. Analysis module 29 of FIG. 1C may perform this determination. The text received at step 330 may be stored by server 20. For example, the text received at this step may be stored in storage structure 26b of FIG. 1C.

At step 340, in some embodiments, analysis module 29 determines phrases from the text received at step 330 for analysis. For example, analysis module 29 may determine to analyze sentences individually within the text received at step 330. As another example, analysis module 29 may use a word count to determine the phrases that will be analyzed from the text received at step 330, such as determining a phrase for every set of five words in the text received at step 330. As another example, analysis module 29 may use one or more delimiters such as punctuation marks, tabs, new lines, new paragraph or other suitable delimiters to determine the phrases to analyze at step 340. Analysis module 29 may analyze only certain portions of the text received at step 330 when determining the phrases to analyze. For example, if the text received at step 330 was a message, analysis module 29 may determine the phrases to analyze at step 340 only from the body of the message and not from headers or the subject line of the message. As another example, if the text received at step 330 was a profile, then analysis module 29 may determine to analyze phrases only in narrative portions of the profile and not portions of the profile that only included single character or single word responses from the user. For example, a profile may include one or more portions where a user enters single character or single word response to questions like what is the age, sex, birth date, name and other such information from a user. Other portions of the profile may include narrative responses that include one or more sentences in response to questions that a user uses to create the profile. As another example, server 20 may have received text including multiple sentences at step 330. In this example, analysis module 29 may determine that each sentence will be analyzed at step 340.

At step 350, in some embodiments, the phrases determined at step 340 are compared to text known to be genuine. The text known to be genuine may have been stored at step 310. Each phrase determined at step 340 may be compared to the text known to be genuine stored at step 310. The comparison may occur to determine if there are matches between the phrases determined at step 340 and the text known to be genuine stored at step 310. Analysis module 29 may determine that a match exists by determining whether a specific number of words in the text known to be genuine occur in the same order as in the phrases determined at step 340. For example, if two or more words occur in the same order in one of the phrases determined at step 340 and in the text known to be genuine stored at step 310 then a match may be determined between that phrase and the portion of the text stored known to be genuine. Matches of two words may be determined even if the two words occur in the middle of the phrase. For example, if the text received at step 330 included the phrase "I enjoy sleeping," a match may be determined with the phrase "many people enjoy sleeping too much," because the pair "enjoy sleeping" is in both phrases.

In some embodiments, a phrase may be matched to multiple phrases or sentences in the text known to be genuine stored at step 310. Analysis module 29 may be configured to identify the closest matching phrase in the text known to be genuine or may be configured to identify all of the matching phrases in the text known to be genuine. For example, if the phrase being matched is "my favorite color is blue," and the phrases "my favorite color is red" and "my favorite color is blue" are phrases that were stored at step 310 then analysis module 29 may determine that the phrase determined in step 340 matches both of these phrases. In some cases though, analysis module 29 may be configured to only match the phrase to the closest matching phrases in the text known to be genuine. In such cases analysis module 29 would only identify the phrase "my favorite color is blue" from the phrases stored in step 310.

In some embodiments, analysis module 29 may be configured to only identify a match when a minimum number of words match between the phrases determined at step 340 and the text known to be genuine stored at step 310. For example, analysis module 29 may be configured to only identify a match when there are at least two words that appear in the same order between the phrases determined at step 340 and the text stored at step 310. Continuing the example, if the phrase being analyzed is "my favorite color is blue," then sever 20 may be configured to determine that this matches the phrase "my favorite color is red" but analysis module 29 may also determine that the phrase does not match, "my least favorite color is blue." Other suitable minimum word requirements may be used in various embodiments.

In some embodiments, analysis module 29 may perform the matching at step 350 by traversing one or more tree-like structures such as tree 200 of FIG. 2. For example, the text known to be genuine may be stored in a manner similar to tree 200. Analysis module 29 may perform the matching described above by comparing the text received at step 330 to the tree structure including the text known to be genuine by traversing the words in the branches of the tree structure. This may be advantageous in that it may allow for faster matching and/or reduction of memory consumption. For example, word pairs may be formed from adjacent words in each phrase of the phrases determined at step 340 and places in the tree structure where the word pairs occur may be determined (i.e., using a dictionary-like structure that associates word pairs with their location in the tree-like structure).

At step 360, in some embodiments, the phrases determined at step 340 are compared to text known to be fraudulent. This may be performed by analysis module 29. This step may be performed in a manner to step 350, except that the text received at step 330 is being compared to text known to be fraudulent.

In some embodiments, steps 350 and 360 may be performed in combination such that comparing the phrases determined at step 340 to text known to be fraudulent and comparing the phrases determined at step 340 to text known to be fraudulent may be performed at the same time. This may occur, for example, if the text known to be fraudulent and known to be genuine is stored in the same structure (such as tree 200 of FIG. 2). Traversing a structure such as tree 200 may be done to perform both steps 350 and 360 at the same time. For example, word pairs may be formed from adjacent words in each phrase of the phrases determined at step 340 and places in the tree structure where the word pairs occur may be determined (i.e., using a dictionary-like structure that associates word pairs with their location in the tree-like structure). In some embodiments, one of either steps 350 or 360 may not be performed. For example, phrases determined at step 340 may be compared to text known to be genuine and not to text known to be fraudulent. As another example, phrases determined at step 340 may be compared to text known to be fraudulent and not to text known to be genuine.

At step 370, in some embodiments, analysis module 29 scores the phrases matched at steps 350 and/or 360. The score determined for each of the phrases determined at step 340 may be based on the number of words that were matched at steps 350 and/or 360. The score may also be determined by taking into account from where the matches came. For example, the score may reflect whether the matching phrase came from text known to be genuine or text known to be fraudulent. For example, the phrase "my favorite color is blue" may have been matched to the phrases "my favorite color is green" and "my favorite sport is baseball" at step 350. The score determined for the match with the phrase "my favorite color is green" may be +4 because the matching sentence had four matching words with the phrase being scored. The score for the matching phrase "my favorite sport is baseball" may be +2 because only two words were matched. In some embodiments, if a phrase identified at step 340 matches to the same phrase in text known to be genuine and known to be fraudulent, only the match corresponding to the text known to be bad will be scored.

In some embodiments, phrases matched to text that is known to be genuine may be give positive scores while phrases matched to text known to be fraudulent may be given negative scores. For example, matches determined at step 360 may be given a negative score with the size of the score proportional to the number of words that match between the phrase being scored and the matching phrase from the text known to be fraudulent. For example, if the phrase to be scored is "I am very cute" and if the phrases determined at step 360 are "I am very cute" and "I am very pretty" then the phrases may be given a value of −4 and −3, respectively, since the phrase "I am very cute" has four matching words and the phrase "I am very pretty" has only three matching words. As discussed above with respect to steps 350 and 360, in some embodiments each phrase determined at step 340 may only have one matching phrase from each of the text known to be genuine and the text known to be fraudulent. Hence, in such embodiments, only those matching phrases will be scored. The various scores determined at step 370 for the various matching phrases determine at steps 350 and 360 may be summed to generate an overall score for each phrase of the phrases determined at step 340. All of the overall scores for each of the phrases may also be summed to then generate an overall score for the text received at step 330.

For example, the phrases to be scored at step 370 may be "my favorite color is blue" and "I am very cute" because those phrases were identified in step 340. The first phrase may have been matched with the phrase "my favorite color is green" from the text known to be genuine at step 350 and matched with the phrase "my favorite hobby is building" from the text known to be fraudulent at step 360. A score of +4 may be determined as for the match with the phrase "my favorite color is green" because the matching phrase has four words in common with the phrase "my favorite color is blue" and because the matching phrase came from the text known to be genuine. A score of −2 may be determined for the match with the phrase "my favorite hobby is building" because the matching phrase has two words in common with the phrase "my favorite color is blue" and because the matching phrase came from the text known to be fraudulent. An overall score for the phrase "my favorite color is blue" may be +2 by summing the scores generated for the matching phrases.

Continuing the example, the second phrase "I am very cute" may have been matched with phrase "I am caring" from the text known to be genuine at step 350 and matched with the phrase "I am very pretty" from the text known to be fraudulent at step 360. A score of +2 may be determined as for the match with the phrase "I am caring" because the matching phrase has two words in common with the phrase "I am very pretty" and because the matching phrase came from the text known to be genuine. A score of −3 may be determined for the match with the phrase "I am very pretty" because the matching phrase has three words in common with the phrase "I am very cute" and because the matching phrase came from the text known to be fraudulent. An overall score for the phrase "I am very cute" may be −1 by summing the scores generated for the matching phrases. The overall score for the text received at step 330 may be the sum of the scores of the phrases identified at step 340. In this example, the overall score for the received text may be +1 as a result of summing the scores for "my favorite color is blue" and "I am very cute."

In some embodiments, scores may be weighted depending on the number of times a phrase appears in the text known to be genuine or known to be fraudulent. For example, if the phrase "I am very cute" was matched to the phrase "I am very pretty" and the phrase "I am very pretty" occurred five times in the text known to be fraudulent, the −3 score assigned to the phrase "I am very cute" may be multiplied by 5 resulting in a score for the phrase of −15.

In some embodiments, a structure such as tree 200 of FIG. 2 may be used when determining scores at step 370. For example, each branch of the tree structure may be associated with a count that reflects the number of sentences or phrases that included the branch from both the text known to be genuine and the text known to be fraudulent as discussed in the examples above. A phrase to be scored at this step may be broken down into a series of word pairs formed from adjacent words in the phrase. For each word pair of the phrase (starting with the first), branches of the tree that include the word pair may be identified. This may be accomplished using a dictionary-like structure that stores associations between word pairs and their locations in the tree structure. For each branch identified for a word pair, the remaining word pairs of the phrase are used to traverse the tree starting from the identified branch to determine the highest number of corresponding branches. The set of branches that corresponds most to the remaining word pairs may be considered the longest matching traversal of the tree. The set of branches that form the longest traversal of the tree are used to determine the score of the phrase. If the longest traversal of a particular word pair of the phrase being scored is already included in a longer traversal of another word pair of the phrase being scored, then the longest traversal for the particular word pair may not be used to determine the score and discarded. The sum of the scores assigned to each traversal not discarded may be the score for the phrase. Each traversal may be scored by taking the count of the deepest branch of the traversal and multiplying it by the length of the traversal. This product may then be divided by the overall length of the phrase (i.e., the number of words in the phrase). In some embodiments, the score assigned to a phrase may also reflect the percentage of the phrase that was matched to the text known to be genuine and the text known to be fraudulent.

At step 380, in some embodiments, the score(s) determined at step 370 may be compared to one or more thresholds by analysis module 29. If the score is greater than the threshold then step 390 may be performed. If the score is less than the threshold then step 395 may be performed. The threshold may be determined by a given set of tolerance parameters that may be configured to allow or deny text to be processed by server 20. For example, if the threshold is set higher, then there would be a correspondingly lower tolerance for potentially fraudulent text submissions using the example scoring method discussed above. If the threshold is set lower, then there would be a correspondingly higher tolerance for potentially fraudulent submissions using the same example scoring method. The threshold may vary based on the type of text received at step 330. For example, one threshold may be set for an email whereas another threshold may be set for a profile submission. As another example, the threshold may vary depending on various characteristics of the user submitting the text. For example, if the user's text is received from a particular geographical region, such as one known to send a higher or lower than normal number of fraudulent submissions, then the threshold may be set lower or higher depending upon the configuration of server 20 and/or analysis module 29. Other characteristics that may be used to determine various thresholds that may be applied at step 380 may include the age of the user, the sex of the user, the device from which the user submitted the text, prior history of the user's submissions to server 20, photograph of the user, the length of time the user has interacted with server 20, or other suitable characteristics.

At step 390, in some embodiments, the text received at step 330 may be flagged by server 20. This may be because the text was determined to be fraudulent by analysis module 29. For example, if the sum of the scores generated at step 370 was less than the threshold, then the text received at step 330 may be determined to be fraudulent and therefore rejected. As another example, the text may be determined not to be genuine as a result of the sum of the scores generated at step 370 being less than the threshold. In various embodiments, text determined not be genuine may be deemed to be fraudulent.

At this step, text that may be rejected may be used for further analysis. Depending on the type of text received at step 330, the actions performed at step 390 and rejecting the text may be different. For example, if the text received at step 330 was a profile, then the profile may not be stored in the same location or in the same manner as other profiles that are active on server 20. As another example, if the text received at step 330 was a message, then the message may not be delivered to the intended recipient at this step. As another example, if the text received at step 330 was a message or if it was a profile, the message may be delivered or the profile may be stored but the user associated with the message or the profile may be flagged for further investigation (e.g., manual review). Rejecting the text may also include performing one or more remedial actions at this step. For example, a human administrator may be contacted as a result of rejecting the text at this step. As another example, the user submitting the text received at step 330 may be suspended from further activities in one or more services offered by server 20. As another example, the content of the text may be sent to a human analyst for further analysis. As another example, the text may be added to a set of known fraudulent text to be used for the analysis of text newly received by server 20.

At step 395, in some embodiments, the text received at step 330 may be processed. This may occur because it has been determined that the text received at step 330 is genuine. The text may have been determined to be genuine by determining that the score generated for the text at step 370 is greater than a threshold. Processing the text at this step may include different actions depending on the type of text received at step 330. For example, if the text received at 330 is a profile then processing the text at this step may include activating a user account on server 20 or updating an existing profile for one or more services offered by server 20. If the text received at step 330 was a message, then processing the text at this step may include delivering the message.

FIG. 4 is a flowchart illustrating one embodiment of how text may be analyzed to determine whether it is genuine or fraudulent using a different algorithm than illustrated in FIG. 3. At step 410, in some embodiments, text known to be genuine may be stored. For example, server 20 may receive profiles or messages from users 14 of FIG. 1A. It may be determined that the content submitted by users 14 is genuine. In some embodiments, such a determination may be based on subsequent activity of users 14, based on a review of the submitted content, and/or on other factors. As another example, users 14 may send messages that are determined to be genuine. The text of the content known to be genuine submitted by users 14 may be stored at storage structure 26a of FIG. 1C at step 410.

In some embodiments, the text may be processed before being stored. Such processing may be performed by analysis module 29 of FIG. 1C. For example, the text may be normalized, punctuation may be removed or reformatted, white spaces, tabs, line breaks, or other similar formatting may be normalized and/or removed, or other suitable modifications may be performed on the text before it is stored. In some embodiments, the text may be stored by assigning an index to each word in the known genuine text and assigning a value to each word in the known genuine text based on the frequency with which that word appears in the known genuine text. Each word may have a unique index. The index may be determined by any suitable algorithm, such as hashing. In some embodiments, it may be determined that a certain number of words in the text known to be genuine may not be assigned an index and be discarded (i.e., not stored) at step 410. For example, the top one hundred most frequent words appearing in the text known to be genuine may be discarded. In some embodiments, this may be advantageous because words such as "a," "the," "and," "or," and "but" may undesirably affect the scoring discussed in the steps below.

In some embodiments, the text stored at step 410 may be selected from recent user activity. For example, text determined to be genuine and stored at step 410 may be taken from user submissions such as profile submissions, registrations, and/or messages that occurred within a given time frame, such as within a day or within a particular number of hours (e.g., five hours). This may be advantageous, in various embodiments, as it allows for the analysis described in FIG. 4 to be automatically updated with recent information or trends in user submissions.

At step 420, in some embodiments, text known to be fraudulent may be stored. This step may occur before, during, or after step 410. For example, server 20 may receive profiles or messages from users 15 of FIG. 1A. It may be determined that the content submitted by users 15 is fraudulent. In some embodiments, such a determination may be based on subsequent activity of users 15 and/or based on a review of the content of the received profiles. Examples of fraudulent content submitted by users 15 may include impersonation, phishing messages, spam, false identification information, automatically generated profiles, and false profiles. The text of the content submitted by users 15 known to be fraudulent may be stored by server 20 of FIG. 1A at step 420. For example, the text may be stored in storage structure 26a of FIG. 1C.

In some embodiments, the text may be processed before being stored. Such processing may be performed by analysis module 29 of FIG. 1C. For example, the text may be normalized, punctuation may be removed or reformatted, white spaces, tabs, line breaks, or other similar formatting may be normalized and/or removed, or other suitable modifications may be performed on the text before it is stored. In some embodiments, the text may be stored by assigning an index to each word in the known genuine text and assigning a value to each word in the known genuine text based on the frequency with which that word appears in the known genuine text. The indices assigned at this step may be performed in such a manner that a word appearing in both text known to be genuine and known to be fraudulent is assigned the same index. For example, the same hashing algorithm applied at step 410 may be applied at step 420. In some embodiments, it may be determined that a certain number of words in the text known to be fraudulent may not be assigned an index and be discarded (i.e., not stored) at step 420. For example, the top one hundred most frequent words appearing in the text known to be genuine may be discarded. In some embodiments, this may be advantageous because words such as "a," "the," "and," "or," and "but" may undesirably affect the scoring discussed in the steps below.

In some embodiments, the text stored at step 420 may be selected from recent user activity. For example, text determined to be genuine and stored at step 420 may be taken from user submissions such as profile submissions, registrations, and/or messages that occurred within a given time frame, such as within a day or within a particular number of hours (e.g., five hours). This may be advantageous, in various embodiments, as it allows for the analysis described in FIG. 4 to be automatically updated with recent information or trends in user submissions.

At step 430, in some embodiments, text is received at server 20 from a user such as one of users 14 or 15. As examples, a user may submit a profile or a message. Server 20 may be configured to determine whether the text received at this step is genuine or fraudulent. Analysis module 29 of FIG. 1C may perform this determination. The text received at step 430 may be stored by server 20. For example, the text received at this step may be stored in storage structure 26b of FIG. 1C.

At step 440, in some embodiments, indices may be determined for the words received at step 430. Words determined not to be assigned an index at steps 410 and 420 may not have indices to determined for them at step 440. Indices may be determined by using the same algorithm(s) used in steps 410 and 420 or by looking up the indices determined at steps 410 and 420.

At step 450, in some embodiments, scores are generated for the indices determined at step 440. Separate scores may be generated for each index by comparing the index to the text known to be genuine stored at step 410 and/or comparing the index to the text known to be fraudulent stored at step 420. For example, each index scored at step 450 may be matched to the corresponding indices of the text known to be genuine and known to be fraudulent and assigned a score proportional to the frequency value associated with the matching index. In some embodiments, the assigned scores may be weighted depending on whether the matching index is associated with the text known to be genuine or the text known to be fraudulent. For example, scores generated based on indices associated with the text known to be genuine may be positive while scores generated based on indices associated with the text known to be fraudulent may be negative. The overall score for each index determined by at step 440 may be the sum of the scores generated by matching the indices determined at step 440 to the indices generated at steps 410 and 420.

As an example to illustrate how step 450 may be performed in some embodiments, the words and corresponding indices determined at step 440 may be as follows:

| Word | Index |
| --- | --- |
| baseball | 1 |
| basketball | 2 |
| rainbow | 3 |
| grisham | 4 |

At step 450, it may be determined that index 1 has a frequency count of 5 in the text known to be genuine and 3 in the text known to be fraudulent. As a result, the word "baseball" may generate a score of +5 and a score of −3. The overall score for the word "baseball" may be the sum of these scores (+2). Similarly, with respect to the word "basketball," it may be determined that index 2 has a frequency count of 2 in the text known to be genuine and 4 in the text known to be fraudulent. As a result, the word "baseball" may generate a score of +2 and a score of −4 and an overall score of −2. With respect to the word "rainbow," it may be determined that index 3 is not associated with the text known to be genuine and has a frequency of 2 in the text known to be fraudulent. As a result, the word "baseball" may generate a score of −2 because of the index's association with the text known to be fraudulent and not generate a score or generate a score of zero because the index is not associated with the text known to be genuine. The resulting overall score for the word "rainbow" would be −2. With respect to the word "grisham," it may be determined that index 4 is not associated with the text known to be fraudulent and has a frequency of 5 in the text known to be genuine. As a result, the word "grisham" may generate a score of +5 because of the index's association with the text known to be genuine and not generate a score or generate a score of zero because the index is not associated with the text known to be fraudulent. The resulting overall score for the word "grisham" would be +5.

In some embodiments, an overall score for the text received at step 430 may be determined at step 450. For example, a sum of the scores assigned to each index determined at step 440 may be determined. In the example above with the words "baseball," "basketball," "rainbow," and "grisham," the sum of the scores determined for each index would be +3.

At step 460, in some embodiments, the score(s) determined at step 450 may be compared to one or more thresholds by analysis module 29. If the score is greater than the threshold then step 480 may be performed. If the score is less than the threshold then step 470 may be performed. The threshold may be determined by a given set of tolerance parameters that may be configured to allow or deny text to be processed by server 20. For example, if the threshold is set higher, then there would be a correspondingly lower tolerance for potentially fraudulent text submissions using the example scoring method discussed above. If the threshold is set lower, then there would be a correspondingly higher tolerance for potentially fraudulent submissions using the same example scoring method. The threshold may vary based on the type of text received at step 430. For example, one threshold may be set for an email whereas another threshold may be set for a profile submission. As another example, the threshold may vary depending on various characteristics of the user submitting the text. For example, if the user's text is received from a particular geographical region, such as one known to send a higher or lower than normal number of fraudulent submissions, then the threshold may be set lower or higher depending upon the configuration of server 20 and/or analysis module 29. Other characteristics that may be used to determine various thresholds that may be applied at step 460 may include the age of the user, the sex of the user, the device from which the user submitted the text, prior history of the user's submissions to server 20, photograph of the user, the length of time the user has interacted with server 20, or other suitable characteristics.

At step 470, in some embodiments, the text received at step 430 may be flagged by server 20. This may be because the text was determined to be fraudulent by analysis module 29. For example, if the sum of the scores generated at step 450 was less than the threshold, then the text received at step 430 may be determined to be fraudulent and therefore rejected. As another example, the text may be determined not to be genuine as a result of the sum of the scores generated at step 450 being less than the threshold. In various embodiments, text determined not be genuine may be deemed to be fraudulent.

At this step, text that may be rejected may be used for further analysis. Depending on the type of text received at step 430, the actions performed at step 470 and rejecting the text may be different. For example, if the text received at step 430 was a profile, then the profile may not be stored in the same location or in the same manner as other profiles that are active on server 20. As another example, if the text received at step 430 was a message, then the message may not be delivered to the intended recipient at this step. As another example, if the text received at step 430 was a message or if it was a profile, the message may be delivered or the profile may be stored but the user associated with the message or the profile may be flagged for further investigation (e.g., manual review). Rejecting the text may also include performing one or more remedial actions at this step. For example, a human administrator may be contacted as a result of rejecting the text at this step. As another example, the user submitting the text received at step 430 may be suspended from further activities in one or more services offered by server 20. As another example, the content of the text may be sent to a human analyst for further analysis. As another example, the text may be added to a set of known fraudulent text to be used for the analysis of text newly received by server 20.

At step 480, in some embodiments, the text received at step 430 may be processed. This may occur because it has been determined that the text received at step 430 is genuine. The text may have been determined to be genuine by determining that the score generated for the text at step 460 is greater than a threshold. Processing the text at this step may include different actions depending on the type of text received at step 430. For example, if the text received at 430 is a profile then processing the text at this step may include activating a user account on server 20 or updating an existing profile for one or more services offered by server 20. If the text received at step 430 was a message, then processing the text at this step may include delivering the message.

FIG. 5 is a flowchart illustrating one embodiment of how text may be analyzed to determine whether it is genuine or fraudulent using a different method than described with respect to FIGS. 3 and 4. At step 510, in some embodiments, text known to be genuine may be stored. For example, server 20 may receive profiles or messages from users 14 of FIG. 1A. It may be determined that the content submitted by users 14 is genuine. In some embodiments, such a determination may be based on subsequent activity of users 14, based on a review of the submitted content, and/or on other factors. As another example, users 14 may send messages that are determined to be genuine. The text of the content known to be genuine submitted by users 14 may be stored by server 20 of FIG. 1A at step 410. For example, the text may be stored in storage structure 26a of FIG. 1C.

In some embodiments, the text may be processed before being stored. For example, the text may be normalized, white spaces, tabs, line breaks, or other similar formatting may be normalized and/or removed, or other suitable modifications may be performed on the text before it is stored. Sentence ending punctuation, such as question marks, periods, and exclamation marks, may not be immediately removed. Rather, these may be used to demarcate separate sentences in the text known to be genuine.

In some embodiments, the text may be stored by assigning an index to each word in the known genuine text. Each word may have a unique index. The index may be determined by any suitable algorithm, such as hashing.

In some embodiments, the identified sentences from the text known to be genuine may be converted to a string or list of numbers by identifying the indices corresponding to each word of a sentence. For example, the sentence "I enjoy playing piano," may be converted to a list of numbers by identifying the indices corresponding to each of the words in the sentence. In this example, the words may have the following corresponding indices:

| Word | Index |
|---|---|
| I | 20 |
| enjoy | 55 |
| playing | 33 |
| piano | 65 |

Thus, the string or list of numbers corresponding to the sentence "I enjoy playing piano," is [20, 55, 33, 65].

In some embodiments, each word in every sentence is paired with the word after it. The pairs may be added to a storage for text known to be genuine, such as a dictionary or database. The storage structure may be organized such that it stores sentences indexed by the second word in a word pair. This may provide the ability to find all sentences where any two word sequence exists without the need for searching.

In some embodiments, the text stored at step 510 may be selected from recent user activity. For example, text determined to be genuine and stored at step 510 may be taken from user submissions such as profile submissions, registrations, and/or messages that occurred within a given time frame, such as within a day or within a particular number of hours (e.g., five hours). This may be advantageous, in various embodiments, as it allows for the analysis described in FIG. 5 to be automatically updated with recent information or trends in user submissions.

At step 520, in some embodiments, text known to be fraudulent may be stored. For example, server 20 may receive profiles or messages from users 15 of FIG. 1A. It may be determined that the content submitted by users 15 is fraudulent. In some embodiments, such a determination may be based on subsequent activity of users 15 and/or based on a review of the content of the received profiles. Examples of fraudulent content submitted by users 15 may include impersonation, phishing messages, spam, false identification information, automatically generated profiles, and false profiles. The text of the content submitted by users 15 known to be fraudulent may be stored by server 20 of FIG. 1A at step 520. For example, the text may be stored in storage structure 26a of FIG. 1C.

At step 520, in some embodiments, text known to be fraudulent may be stored. This may be done in a manner similar to how text known to be genuine is stored at step 510. In some embodiments, the text stored at step 520 may be selected from recent user activity. For example, text determined to be genuine and stored at step 520 may be taken from user submissions such as profile submissions, registrations, and/or messages that occurred within a given time frame, such as within a day or within a particular number of hours (e.g., five hours). This may be advantageous, in various embodiments, as it allows for the analysis described in FIG. 5 to be automatically updated with recent information or trends in user submissions.

At step 530, in some embodiments, text is received from a user such as one of users 14 or 15 at server 20. As examples, a user may submit a profile or a message. Server 20 may be configured to determine whether the text received at this step is genuine or fraudulent. Analysis module 29 of FIG. 1C may perform this determination. The text received at step 530 may be stored by server 20. For example, the text received at this step may be stored in storage structure 26b of FIG. 1C.

At step 540, in some embodiments, sentences may be identified in the text received at step 530. This may occur by using sentence ending punctuation present in the text received at step 530, such as periods, question marks, and exclamation marks. Other suitable methods for identifying sentences may be employed.

At step 550, in some embodiments, sets of indices corresponding to the sentences identified in step 540 may be determined. Indices may be determined by using the same algorithm(s) used in steps 510 and 520 or by looking up the indices determined at steps 510 and 520. A set of indices may be generated at this step for each sentence identified at step 540 in the form of a list or string of indices. Pairs for adjacent words in each set of indices may also be determined at step 540.

At step 560, in some embodiments, scores may be generated for the text received at step 530. Each sentence identified at step 540 may have a score determined at this step. The sets of indices determined at step 550 may be compared to either or both of the stored text known to be genuine and the stored text known to be fraudulent. For example, a pair of indices of the text received at step 530 may be compared to the pairs of indices stored at steps 510 and 520. A cache or list of sentence references may be kept for comparison. Pairs of indices may be used to record entry and exit points within the matching sentences (stored as sets of indices in steps 510 and 520) of the text known to be genuine and the text known to be fraudulent. This may allow for trimming of matches that are contained within other matches. For example, a match for "hello my name" may be contained within the match for "hello my name is."

The number of matching word fragments may be divided by the count of words in the sentences stored at steps 510 and 520. The total number of match words for the sentence being scored may be summed. This sum may be divided by the total number of words in the sentence being scored to obtain a size of the score for the sentence. The size of the score of the sentence may then be multiplied by a weighting factor depending on whether the score is being generated for matches to text known to be genuine or text known to be fraudulent. For example, a weighting factor of +1 may be used when matching to text known to be genuine, and a weighting factor of −1 may be used when matching to text known to be fraudulent. The two weighted scores for the sentence may then be summed to determine an overall score for the sentence.

In some embodiments, each sentence of the text received at step 530 may be scored in the manner described above. Scores may be generated, in various embodiments, by comparing the sentences only to the text known to be fraudulent or the text known to be genuine. The sum of the scores for the sentences may be calculated to determine an overall score for the text received at step 530.

At step 570, in some embodiments, the score(s) determined at step 560 may be compared to one or more thresholds by analysis module 29. If the score is greater than the threshold then step 590 may be performed. If the score is less than the threshold then step 580 may be performed. The threshold may be determined by a given set of tolerance parameters that may be configured to allow or deny text to be processed by server 20. For example, if the threshold is set higher, then there would be a correspondingly lower tolerance for potentially fraudulent text submissions using the example scoring method discussed above. If the threshold is set lower, then there would be a correspondingly higher tolerance for potentially fraudulent submissions using the same example scoring method. The threshold may vary based on the type of text received at step 530. For example, one threshold may be set for an email whereas another threshold may be set for a profile submission.

As another example, the threshold may vary depending on various characteristics of the user submitting the text. For example, if the user's text is received from a particular geographical region, such as one known to send a high or lower than normal number of fraudulent submissions, then the threshold may be set lower or higher depending upon the configuration of server 20 and/or analysis module 29. Other characteristics that may be used to determine various thresholds that may be applied at step 570 may include the age of the user, the sex of the user, the device from which the user submitted the text, prior history of the user's submissions to server 20, photograph of the user, the length of time the user has interacted with server 20, or other suitable characteristics.

At step 580, in some embodiments, the text received at step 530 may be flagged by server 20. This may be because the text was determined to be fraudulent by analysis module 29. For example, if the sum of the scores generated at step 560 were less than the threshold, then the text received at step 530 may be determined to be fraudulent and therefore rejected. As another example, the text may be determined not to be genuine as a result of the sum of the scores generated at step 560 being less than the threshold. In various embodiments, text determined not be genuine may be deemed to be fraudulent.

At this step, text that may be rejected may be used for further analysis. Depending on the type of text received at step 530, the actions performed at step 580 and rejecting the text may be different. For example, if the text received at step 530 was a profile, then the profile may not be stored in the same location or in the same manner as other profiles that are active on server 20. As another example, if the text received at step 530 was a message, then the message may not be delivered to the intended recipient at this step. As another example, if the text received at step 530 was a message or if it was a profile, the message may be delivered or the profile may be stored but the user associated with the message or the profile may be flagged for further investigation (e.g., manual review). Rejecting the text may also include performing one or more remedial actions at this step. For example, a human administrator may be contacted as a result of rejecting the text at this step. As another example, the user submitting the text received at step 530 may be suspended from further activities in one or more services offered by server 20. As another example, the content of the text may be sent to a human analyst for further analysis. As another example, the text may be added to a set of known fraudulent text to be used for the analysis of text newly received by server 20.

At step 590, in some embodiments, the text received at step 530 may be processed. This may occur because it has been determined that the text received at step 530 is genuine. The text may have been determined to be genuine by determining that the score generated for the text at step 570 is greater than a threshold. Processing the text at this step may include different actions depending on the type of text received at step 530. For example, if the text received at 530 is a profile then processing the text at this step may include activating a user account on server 20 or updating an existing profile for one or more services offered by server 20. If the text received at step 530 was a message, then processing the text at this step may include delivering the message.

In some embodiments, the various methods for determining whether text is fraudulent and/or genuine described above with respect to FIGS. 1A-5, including the various methods of scoring text submitted by a user, may combined or only a subset of any one method may be used. Other suitable scoring methods used to compare text received from a user to text known to be fraudulent and/or genuine may be used instead of, or in addition to, the methods discussed above in various embodiments.

Figure 6:
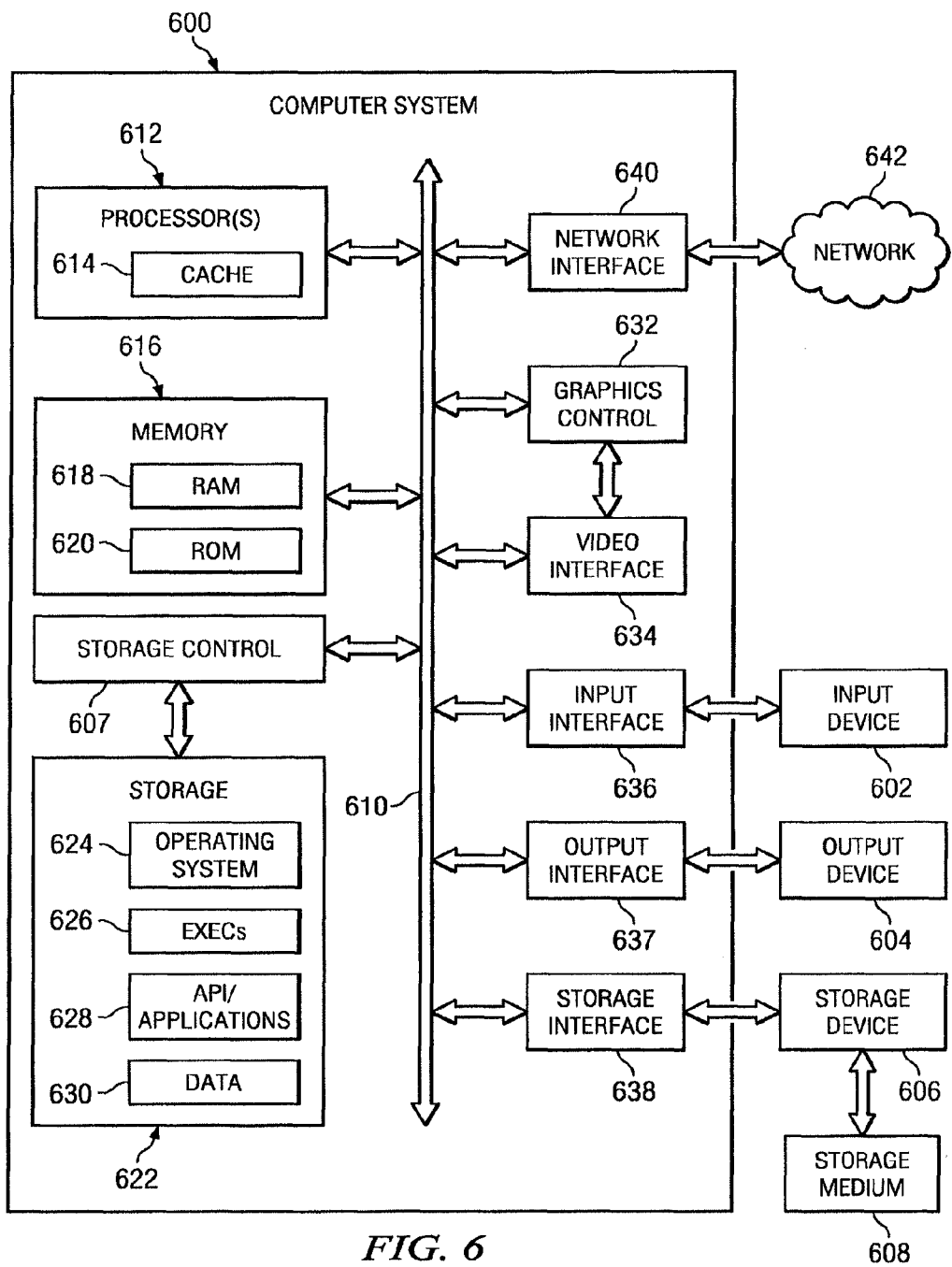
FIG. 6 illustrates an example computer system suitable for implementing one or more portions of particular embodiments.

FIG. 6 illustrates an example computer system 600 suitable for implementing one or more portions of particular embodiments. Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIGS. 1A-1C and one or more steps of FIGS. 3-5 may be implemented using all of the components, or any appropriate combination of the components, of computer system 600 described below.

Computer system 600 may have one or more input devices 602 (which may include a keypad, keyboard, mouse, stylus, or other input devices), one or more output devices 604 (which may include one or more displays, one or more speakers, one or more printers, or other output devices), one or more storage devices 606, and one or more storage medium 608. An input device 602 may be external or internal to computer system 600. An output device 604 may be external or internal to computer system 600. A storage device 606 may be external or internal to computer system 600. A storage medium 608 may be external or internal to computer system 600. In some embodiments, terminals 10 and server 20 of FIG. 1A may be implemented using some or all of the components described above included in computer system 600

System bus 610 couples subsystems of computer system 600 to each other. Herein, reference to a bus encompasses one or more digital signal lines serving a common function. The present disclosure contemplates any suitable system bus 610 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 600 includes one or more processors 612 (or central processing units (CPUs)). A processor 612 may contain a cache 614 for temporary local storage of instructions, data, or computer addresses. Processors 612 are coupled to one or more storage devices, including memory 616. Memory 616 may include random access memory (RAM) 618 and read-only memory (ROM) 620. Data and instructions may transfer bidirectionally between processors 612 and RAM 618. Data and instructions may transfer unidirectionally to processors 612 from ROM 620. RAM 618 and ROM 620 may include any suitable computer-readable storage media.

Computer system 600 includes fixed storage 622 coupled bi-directionally to processors 612. Fixed storage 622 may be coupled to processors 612 via storage control unit 607. Fixed storage 622 may provide additional data storage capacity and may include any suitable computer-readable storage media. Fixed storage 622 may store an operating system (OS) 624, one or more executables (EXECs) 626, one or more applications or programs 628, data 630 and the like. Fixed storage 622 is typically a secondary storage medium (such as a hard disk) that is slower than primary storage. In appropriate cases, the information stored by fixed storage 622 may be incorporated as virtual memory into memory 616. In some embodiments, fixed storage 622 may include network resources, such as one or more storage area networks (SAN) or network-attached storage (NAS). In some embodiments, memory 26, storage structures 26a-b, and analysis module 29 of FIGS. 1A and 1C and tree 200 of FIG. 2 may be implemented using configurations such as the description of memory 616 above.

Processors 612 may be coupled to a variety of interfaces, such as, for example, graphics control 632, video interface 634, input interface 636, output interface 637, and storage interface 638, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 640 may couple processors 612 to another computer system or to network 642. Network interface 640 may include wired, wireless, or any combination of wired and wireless components. Such components may include wired network cards, wireless network cards, radios, antennas, cables, or any other appropriate components. With network interface 640, processors 612 may receive or send information from or to network 642 in the course of performing steps of particular embodiments. Particular embodiments may execute solely on processors 612. Particular embodiments may execute on processors 612 and on one or more remote processors operating together. In some embodiments, processors 612 may be used to implement analysis module 29 of FIG. 1C and/or may perform the steps specified in instructions or code included in analysis module 29 of FIG. 1C.

In a network environment, where computer system 600 is connected to network 642, computer system 600 may communicate with other devices connected to network 642. Computer system 600 may communicate with network 642 via network interface 640. For example, computer system 600 may receive information (such as a request or a response from another device) from network 642 in the form of one or more incoming packets at network interface 640 and memory 616 may store the incoming packets for subsequent processing. Computer system 600 may send information (such as a request or a response to another device) to network 642 in the form of one or more outgoing packets from network interface 640, which memory 616 may store prior to being sent. Processors 612 may access an incoming or outgoing packet in memory 616 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 616 may include one or more tangible, non-transitory, computer-readable storage media embodying software and computer system 600 may provide particular functionality described or illustrated herein as a result of processors 612 executing the software. Memory 616 may store and processors 612 may execute the software. Memory 616 may read the software from the computer-readable storage media in mass storage device 616 embodying the software or from one or more other sources via network interface 640. When executing the software, processors 612 may perform one or more steps of one or more processes described or illustrated herein, which may include defining one or more data structures for storage in memory 616 and modifying one or more of the data structures as directed by one or more portions the software, according to particular needs. In some embodiments, memory 26, storage structures 26a-b, and analysis module 29 of FIGS. 1A and 1C and tree 200 of FIG. 2 may be implemented using configurations such as the description of memory 616 above.

In some embodiments, the described processing and memory elements (such as processors 612 and memory 616) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing. In addition or as an alternative, computer system 600 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although several embodiments have been illustrated and described in detail, it will be recognized that substitutions and alterations are possible without departing from the spirit and scope of the appended claims.

What is claimed is:

1. A method executed by at least one processor comprising the steps of:
   receiving, at a system, a profile submitted by a user, the system configured to compare a set of profiles to one another;
   determining a geographical location from which the profile was submitted;
   determining that the geographical location from which the profile was submitted is a geographical location associated with fraudulent profile submissions;
   determining a text score for the profile by comparing a first set of phrases included in the profile to a second set of phrases, the second set of phrases comprising phrases from stored text, the stored text comprising stored text known to be genuine and stored text known to be fraudulent;
   determining that the profile is fraudulent using the text score and the geographical location from which the profile was submitted; and
   in response to determining that the profile is fraudulent, preventing the system from comparing the profile to the set of profiles.

2. The method of claim 1, wherein determining the text score for the profile by comparing the first set of phrases to the second set of phrases further comprises:
   determining a phrase score for each phrase of the first set of phrases by comparing the words of each phrase of the first set of phrases to the second set of phrases; and
   determining the text score by adding the phrase scores of each phrase of the first set of phrases.

3. The method of claim 1, wherein the stored text is organized in at least one tree structure.

4. The method of claim 1, wherein determining that the profile is fraudulent comprises comparing the text score to a threshold.

5. The method of claim 4, further comprising determining a threshold using a characteristic of the user and wherein comparing the text score to the threshold comprises comparing the text score to the determined threshold.

6. The method of claim 1, wherein comparing the first set of phrases included in the profile to a second set of phrases comprises generating a tree structure corresponding to the first set of phrases.

7. The method of claim 1, wherein the profile is determined to be fraudulent using the text score and using submissions by the user received before the profile.

8. The method of claim 1, wherein the geographical location comprises a geographical region.

9. The method of claim 4, further comprising determining the threshold using the determination that the profile was submitted from a geographical location associated with fraudulent profile submissions.

10. A system comprising:
    an interface configured to receive a profile submitted by a user, the system configured to compare a set of profiles to one another; and
    at least one processor configured to:
       determine a geographical location from which the profile was submitted;
       determine that the geographical location from which the profile was submitted is a geographical location associated with fraudulent submissions;
       determine a text score for the profile by comparing a first set of phrases included in the profile to a second set of phrases, the second set of phrases comprising phrases from stored text, the stored text comprising stored text known to be genuine and stored text known to be fraudulent;
       determine that the received text is fraudulent using the text score and the geographical location from which the profile was submitted; and
       in response to determining that the profile is fraudulent, preventing the system from comparing the profile to the set of profiles.

11. The system of claim 10, wherein the at least one processor configured to determine the text score for the profile by comparing the first set of phrases to the second set of phrases comprises the at least one processor configured to:
    determine a phrase score for each phrase of the first set of phrases by comparing the words of each phrase of the first set of phrases to the second set of phrases; and
    determine the text score by adding the phrase scores of each phrase of the first set of phrases.

12. The system of claim 10, wherein the stored text is organized in at least one tree structure.

13. The system of claim 10, wherein the at least one processor is configured to determine that the profile is fraudulent at least by comparing the text score to a threshold.

14. The system of claim 13, wherein:
    the at least one processor is further configured to determine a threshold using a characteristic of the user; and
    the at least one processor configured to compare the text score to the threshold comprises the at least one processor configured to compare the text score to the determined threshold.

15. The system of claim 10, wherein the at least one processor configured to compare the first set of phrases included in the profile to a second set of phrases comprises the at least one processor configured to generate a tree structure corresponding to the first set of phrases.

16. The system of claim 10, wherein the at least one processor is further configured to determine that the profile is fraudulent using submissions by the user received before the profile.

17. The system of claim 10, wherein the geographical location comprises a geographical region.

18. The system of claim 13, wherein the at least one processor is further configured to determine the threshold using the determination that the profile was submitted from a geographical location associated with fraudulent profile submissions.

19. At least one non-transitory computer-readable medium comprising a plurality of instructions that, when executed by at least one processor, are configured to:

receive, at a system, a profile submitted by a user, the system configured to compare a set of profiles to one another;

determine a geographical location from which the profile was submitted;

determine that the geographical location from which the profile was submitted is a geographical location associated with fraudulent profile submissions;

determine a text score for the profile by comparing a first set of phrases included in the profile to a second set of phrases, the second set of phrases comprising phrases from stored text, the stored text comprising stored text known to be genuine and stored text known to be fraudulent;

determine that the profile is fraudulent using the text score and the geographical location from which the profile was submitted; and in response to determining that the profile is fraudulent, preventing the system from comparing the profile to the set of profiles.

20. The at least one non-transitory computer-readable medium of claim 19, wherein the plurality of instructions configured to determine the text score for the profile comprises the plurality of instructions configured to:

determine a phrase score for each phrase of the first set of phrases by comparing the words of each phrase of the first set of phrases to the second set of phrases; and determine the text score by adding the phrase scores of each phrase of the first set of phrases.

21. The at least one non-transitory computer-readable medium of claim 9, wherein the stored text is organized in at least one tree structure.

22. The at least one non-transitory computer-readable medium of claim 19, wherein the plurality of instructions are configured to determine that the profile is fraudulent at least by comparing the text score to a threshold.

23. The at least one non-transitory computer-readable medium of claim 22, wherein:

the plurality of instructions are further configured to determine a threshold using a characteristic of the user; and the plurality of instructions configured to compare the text score to the threshold comprises the plurality of instructions configured to compare the text score to the determined threshold.

24. The at least one non-transitory computer-readable medium of claim 19, wherein the plurality of instructions configured to compare the first set of phrases included in the profile to a second set of phrases comprises the plurality of instructions configured to generate a tree structure corresponding to the first set of phrases.

25. The at least one non-transitory computer-readable medium of claim 19, wherein the plurality of instructions are further configured to determine that the profile is fraudulent using the text score and using submissions by the user received before the profile.

26. The at least one non-transitory computer-readable medium of claim 19, wherein the geographical location comprises a geographical region.

27. The at least one non-transitory computer-readable medium of claim 22, wherein the plurality of instructions are further configured to determine the threshold using the determination that the profile was submitted from a geographical location associated with fraudulent profile submissions.

* * * * *